(12) United States Patent
Watson et al.

(10) Patent No.: US 11,780,604 B2
(45) Date of Patent: Oct. 10, 2023

(54) COORDINATED PASSENGER PRESCREENING AND DEPLANING

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 182 days.

(21) Appl. No.: 17/163,270

(22) Filed: Jan. 29, 2021

(65) Prior Publication Data

US 2022/0242588 A1 Aug. 4, 2022

(51) Int. Cl.
| | |
|---|---|
| *G06Q 10/00* | (2023.01) |
| *B64D 45/00* | (2006.01) |
| *G08G 5/00* | (2006.01) |
| *G06Q 10/0631* | (2023.01) |
| *G06Q 10/0633* | (2023.01) |
| *G06Q 30/018* | (2023.01) |

(52) U.S. Cl.
CPC ......... *B64D 45/00* (2013.01); *G06Q 10/0633* (2013.01); *G06Q 10/06316* (2013.01); *G08G 5/0021* (2013.01); *B64D 2045/007* (2013.01); *G06Q 30/018* (2013.01)

(58) Field of Classification Search
CPC combination set(s) only.
See application file for complete search history.

(56) References Cited

U.S. PATENT DOCUMENTS

| | | | |
|---|---|---|---|
| 8,510,086 B1 * | 8/2013 | Winkler | G06F 30/20 |
| | | | 703/7 |
| 2018/0265203 A1 * | 9/2018 | Agrawal | B64D 11/0696 |
| 2021/0209714 A1 * | 7/2021 | Kropf | B64F 1/30 |
| 2022/0189227 A1 * | 6/2022 | Purohit | G07C 9/22 |
| 2022/0405653 A1 * | 12/2022 | Villa | G06Q 10/025 |

* cited by examiner

*Primary Examiner* — Matheus Ribeiro Stivaletti
(74) *Attorney, Agent, or Firm* — Perkins Coie LLP (57) ABSTRACT

Devices, systems and methods for electronic systems that manage an order in which an aircraft is boarded or deplaned are described. An exemplary method includes configuring an onboard computer to execute a script, wherein the script controls an order by which passengers on an airplane are prompted for deplaning, updating the script for a travel segment of the airplane using a first input comprising a passenger information for the travel segment or a second input comprising a travel configuration of the airplane during the travel segment or a third input from onboard crew of the airplane; and controlling onboard electronic equipment of the airplane by executing the script at an end of the travel segment by prompting passengers to deplane the airplane in the order.

20 Claims, 7 Drawing Sheets

COORDINATED PASSENGER PRESCREENING AND DEPLANING

TECHNICAL FIELD

This document is directed generally to electronic systems useful for aircraft boarding and deplaning.

BACKGROUND

Boarding an aircraft prior to departure and conversely deplaning the aircraft after landing typically entail a complex coordination between ground staff and aircraft crew. Delays in operation of conventional electronic systems in assisting airlines personnel during these operations often lead to passenger dissatisfaction.

SUMMARY

Embodiments of the disclosed technology may be used for safe and speedy passenger boarding and deboarding.

In one exemplary aspect, a method for managing airplane deplaning is disclosed. The method includes configuring an onboard computer to execute a script, wherein the script controls a desired order by which passengers on an airplane are prompted for deplaning, updating the script for a travel segment of the airplane using a first input comprising a passenger information for the travel segment or a second input comprising a travel configuration of the airplane during the travel segment or a third input from onboard crew of the airplane, and controlling onboard electronic equipment of the airplane by executing the script at an end of the travel segment by prompting passengers to deplane the airplane in the desired order.

In another exemplary aspect, a computer system for facilitating operation of an airplane is disclosed. The computer system includes an onboard computer located on an airplane, the onboard computer comprising one or more processors configured to execute a script, wherein the script controls an order by which passengers on an airplane are prompted for deplaning, the one or more processors further configured to update the script for a travel segment of the airplane using a first input comprising a passenger information for the travel segment or a second input comprising a travel configuration of the airplane during the travel segment or a third input from onboard crew of the airplane, and onboard electronic equipment of the airplane that is coupled to the onboard computer and configured to prompt passengers to deplane the airplane in the order according to execution of the script by the onboard computer at an end of the travel segment.

In yet another example aspect, a computer-readable storage medium is disclosed. The storage medium includes code causing the processor to store a default script that controls a default order by which passengers on an airplane are prompted for deplaning, update the script for a travel segment of the airplane using a first input comprising a passenger information for the travel segment or a second input comprising a travel configuration of the airplane during the travel segment or a third input from onboard crew of the airplane, and control onboard electronic equipment of the airplane by executing the script at an end of the travel segment by prompting passengers to deplane the airplane in the order.

In yet another exemplary aspect, the above-described methods are embodied in the form of processor-executable code stored in a computer-readable program medium.

In yet another exemplary embodiment, a commercial passenger vehicle in which the above-described methods are implemented is disclosed.

The above and other aspects and their implementations are described in greater detail in the drawings, the descriptions, and the claims.

DETAILED DESCRIPTION

Section headings are used in the present document to facilitate ease of reading and do not limit scope of the disclosed technology to the corresponding section. Accordingly, techniques described in different sections may be combined together by various embodiments that use the disclosed technology.

Boarding and deplaning passengers on a commercial aircraft can be complex process that requires coordination between several activities occurring inside a terminal and onboard an aircraft. Furthermore, passengers' travel satisfaction also often depends on how easily they are able to get on or off an airplane.

In recent years, this process has become even more complex due to emergence of several additional logistical issues. For example, airlines have begun using newer airplanes that have significantly larger passenger capacity, which has therefore made passenger board/deplaning a lot more complex and time-consuming process. Similarly, new social distancing rules and etiquettes have put pressure on airlines to ensure that crowding is avoided during the boarding/deplaning process. Furthermore, in view of recent outbreaks of contagious diseases, a health prescreening process is being adopted at several airports prior to boarding an airplane.

Existing methods for orderly deplaning of passengers from a transport vehicle are nil or are at best unspoken social conventions to deplane front to back. New social distancing requirements due to COVID-19 apply not only to boarding, inflight, but also during exiting the vehicle. Presently, when an airplane reaches its destination, passengers are often eager to deplane as fast as they can. This often leads to crowding in aisles. This crowding may be undesirable because of recent social distancing guidelines due to spread of communicable diseases. Furthermore, crowding in the aisle sometimes tends to slow down the entire deplaning process similar to "traffic jams" created on streets during rush hour. Airlines often board passengers by boarding groups, but no such facility or automated way is implemented currently to systematically allowing passengers to get off an airplane.

While crew PA announcements can guide the deplaning process, visual indicators to passengers are also desired, and apply especially to the aurally impaired. Similar guidelines are also expected to be used for other communicable diseases in future. These health concerns may be, for example, about airborne spreading of diseases and/or diseases that spread easily through contact or surface contamination. Examples include viruses and bacteria that are especially known to be transmitted on commercial passenger vehicles, such as coronavirus, bird flu, swine flu, Middle East Respiratory Syndrome (MERS), hantavirus and so on. However, the techniques described herein may also be practiced for social distancing and avoidance of other traditional communicable diseases such as common cold, cough, influenza, chickenpox, measles, tuberculosis, and so on.

Another operational challenge faced by airlines is the process of boarding a flight and getting the flight ready for departure. Local safety rules, Federal laws and/or airlines protocols often require passengers to watch passenger safety videos prior to take-off. The safety demonstrations are often overlooked by passengers but take valuable departure time nonetheless because they are mandatory prior to takeoff.

Presently, no technical solutions are available for adoption by computer systems used by airlines industry to facilitate smooth passenger boarding and deplaning.

The present document provides techniques that can be adopted by computer and electronic systems onboard an aircraft or in a ground facility such as an airport terminal to improve the workflow of passenger boarding or passenger deboarding.

1. Example Embodiments of Ordered Passenger Boarding or Deplaning

Figure 7:
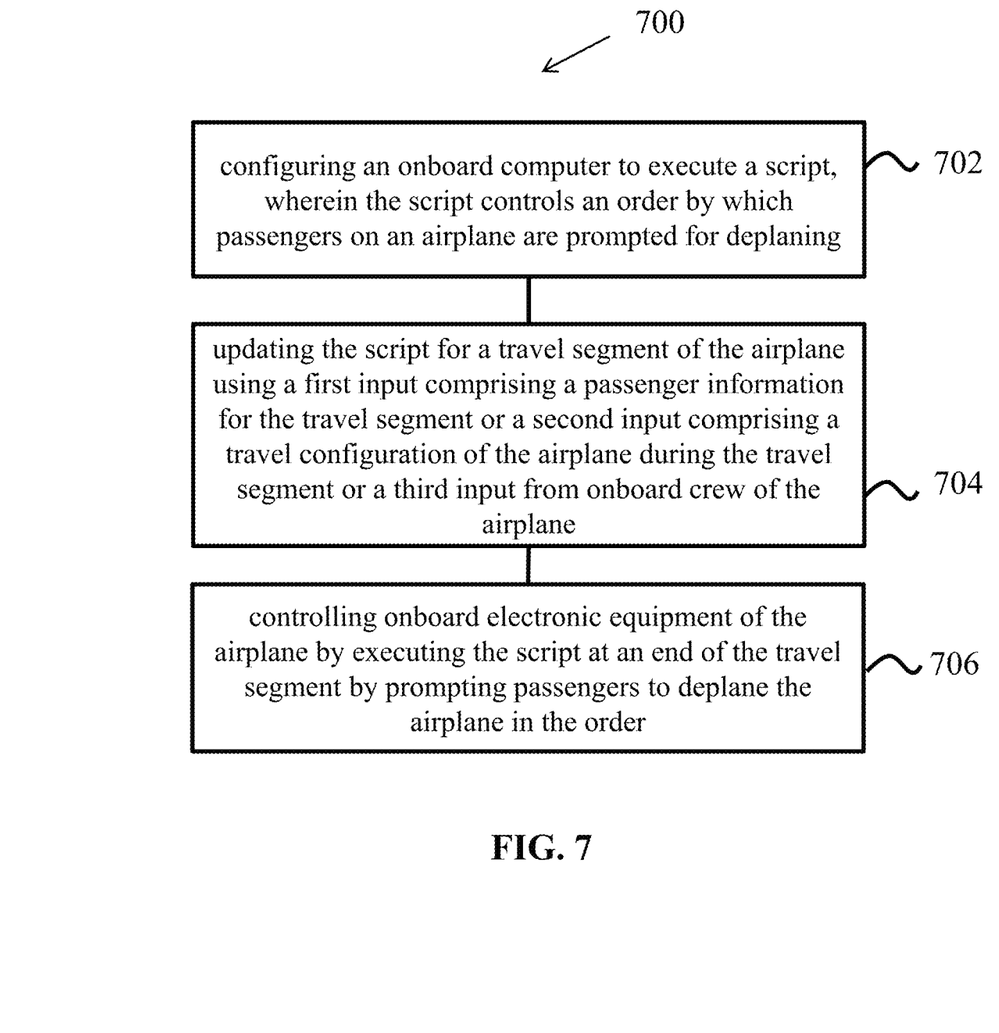
FIG. 7 is a flowchart for an example method of a script-based method of passenger boarding or deplaning in an airplane.

FIG. 7 shows an example method 700 used for managing passenger egress from an airplane. The method 700 may be implemented by an onboard server such as servers 122, 404 or 506 described in the present document. The onboard server may be configured to execute a script by loading an executable program and/or the script into a memory of the onboard server. Various examples of the script are described in the present document.

The method 700 may include configuring (702) an onboard computer to execute a script, wherein the script controls an order by which passengers on an airplane are prompted for deplaning. Various examples of the script and execution of the script are described throughout the present document, e.g., sections 3, 7 and 8.

The method 700 may include updating (704) the script for a travel segment of the airplane using one or more of: a first input comprising a passenger information for the travel segment, a second input comprising a travel configuration of the airplane during the travel segment, or a third input from onboard crew of the airplane. Various examples of updating of the script based on various inputs are described throughout the present document, e.g., sections 3, 4, 5, 7, 8 and 9.

The method 700 may include controlling (706) onboard electronic equipment of the airplane by executing the script at an end of the travel segment by prompting passengers to deplane the airplane in the order. Various examples of execution of the script for advancing the deplaning process are described throughout the present document, e.g., sections 8 and 9.

In some embodiments, the method 700 further includes collecting sensor information from a sensor indicative of passenger passage during deplaning and cross-checking an actual deplaning sequence of the passengers based on the sensor information with the order prompted by using the script for a mismatch. Various examples of use of feedbacks from sensors such as door sensors or proximity sensors for advancing the deplaning process are described throughout the present document, e.g., section 9.

In some embodiments, the script may be configured by generating the script to comply with a regulatory requirement of a departure destination of the travel segment, an arrival destination of the travel segment, or an airlines policy. Additional details are disclosed throughout the document, e.g., sections 3, 8 and 9.

In some embodiments, the method 700 includes determining a degree of separation among passengers based on analyzing the passenger information; and providing an alert in case that the degree of separation falls below a threshold. Additional features are described in, for example, Section 10, 11 and 12.

In method 700, the second input regarding the travel configuration may include a passenger occupancy map. The script may be updated by using a deplaning priority information associated with at least some of the passengers with the passenger occupancy map. As further described in Sections 3, 8 and 9, the deplaning priority information may be included in the passenger manifest and/or the script.

In some embodiments, the third input from the airplane crew includes a modification to the order. Some examples are disclosed in Section 6.

Figure 1:
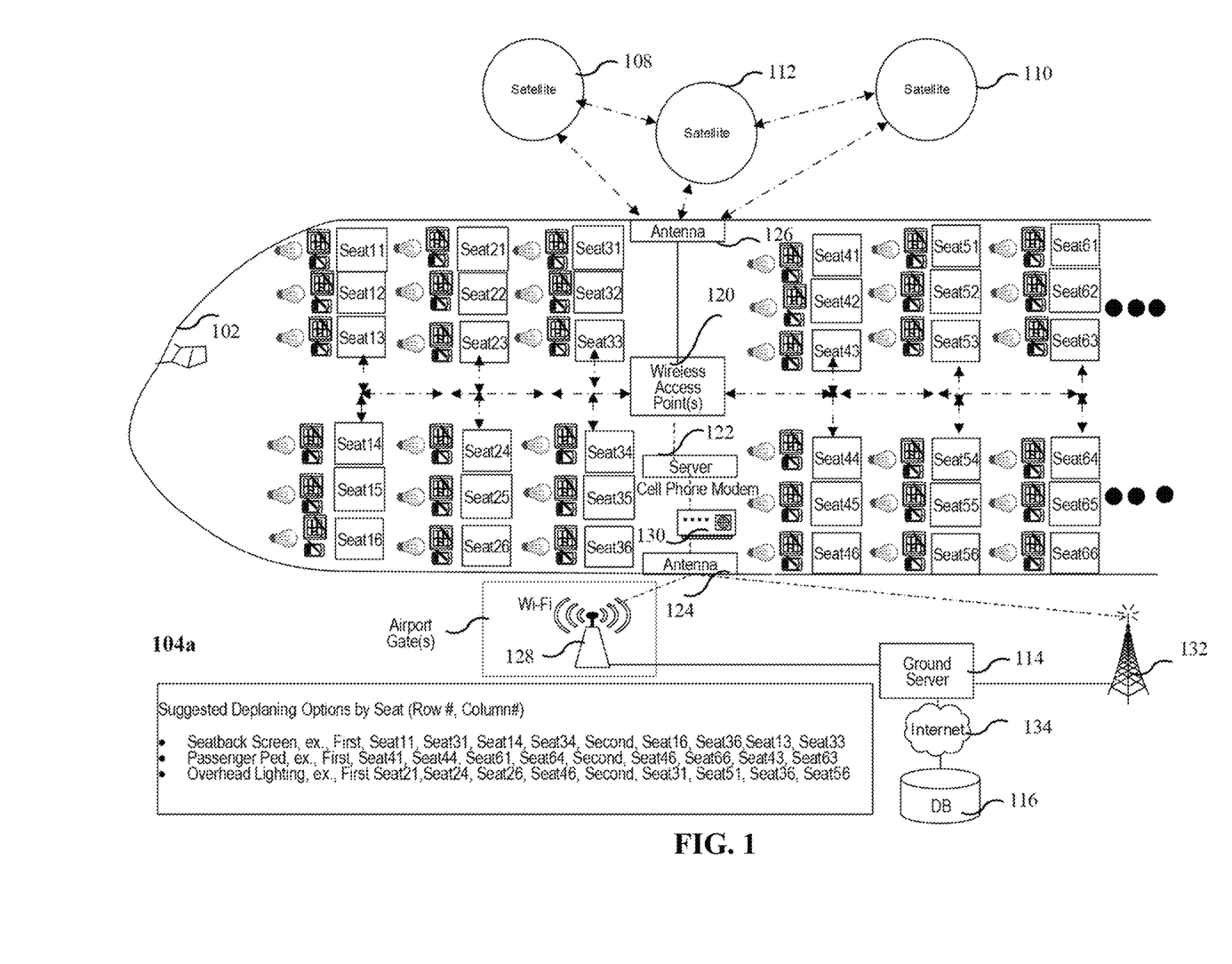
FIG. 1 shows an example of a system for passenger boarding and deplaning.
Figure 2:
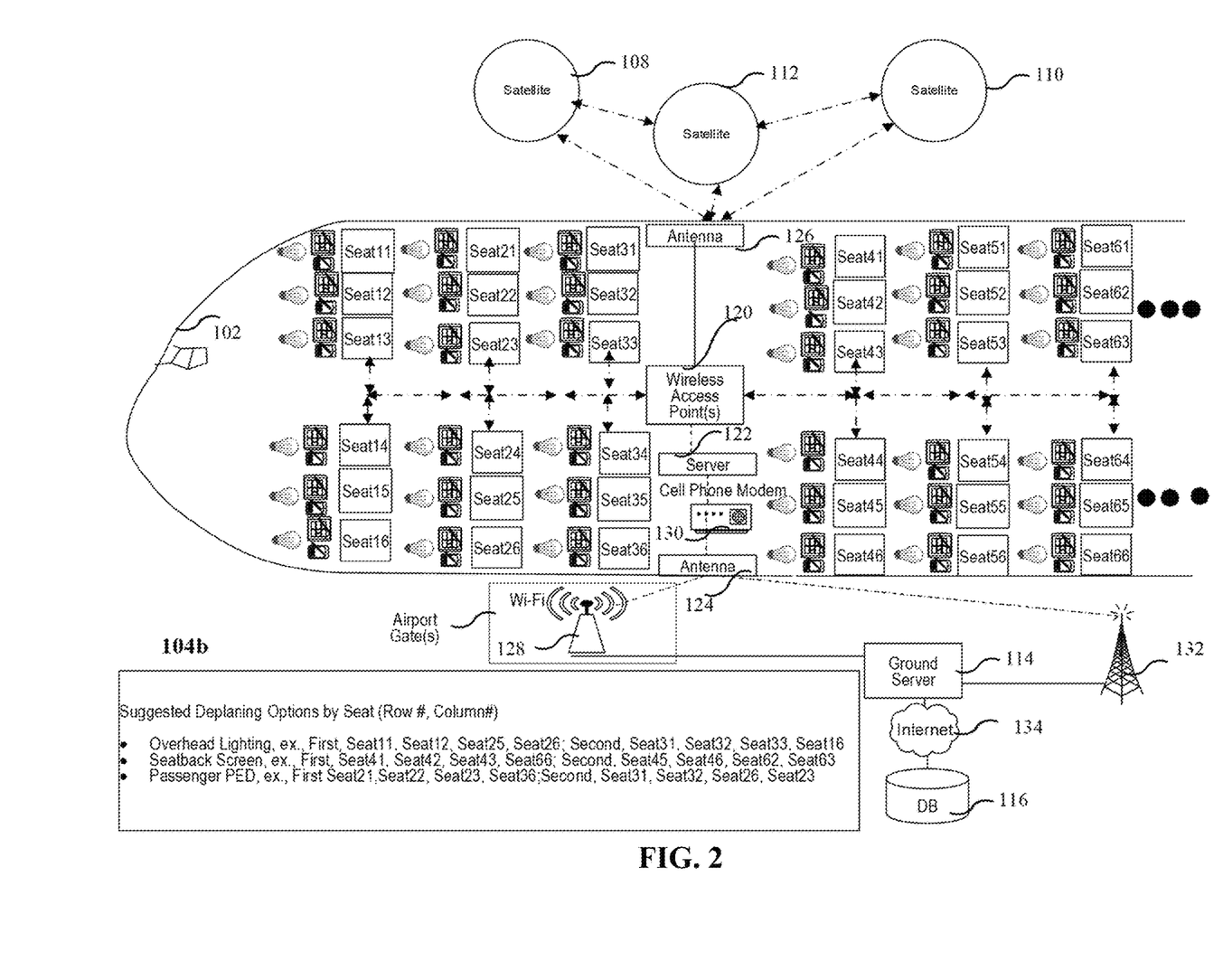
FIG. 2 shows another example of a system for passenger boarding and deplaning.

As further described with respect to FIGS. 1, 2 and Sections 3 and 7, the script may include an ordered list of airplane zones for deplaning and explicit or implicit time gaps or time intervals between the deplaning from the airplane zones. In some embodiments, the time gaps between the deplaning are responsive to the passenger information are updated during the updating from their default values to values that are based on occupancy of seat rows and other considerations described in the present document.

As further described in the present document, e.g., section 2, the onboard electronic equipment includes a public announcement system or passenger seatback displays or overhead lights or passenger personal electronic equipment and correspondingly the prompting passenger to deplane includes playing overhead announcements or displaying a visual prompt to deplane or activating the overhead lights or sending a message to the passenger personal electronic equipment.

As further described in the present document, e.g., sections 10, 11 and 12, the script is further configured to control a boarding sequence in which passengers are allowed to board the airplane at least based on indications of completion of security formalities by the passengers. Security formalities may include, for example, the passenger watching and acknowledging a safety video. In some embodiments, the boarding sequence may be controlled based on a passenger occupancy map. In some embodiments, the boarding sequence may be determined based on passenger vaccination information as is described throughout the present document, e.g., Section 13. In some embodiments, the boarding sequence may be in reverse of the deplaning sequence. For example, vaccinated passengers may be incentivized to board first and also deplane first, or vaccinated and unvaccinated passengers may be grouped into different boarding or deplaning categories or zones according to their respective risk factors determined according to a technique described in the present document.

Various embodiments of the process 700 are described throughout the present document.

2. Examples of Controlling Onboard Electronic Equipment

The above-described operation of prompting passengers to deplane the airplane may be performed in an orderly manner using a script-based approach in which onboard electronic equipment may be used for prompting passengers that it is now their turn to deplane. In some embodiments, as further described in Section 14, the below-described electronic equipment may be used in an order according to the script and/or crew input.

2A. Seatback Screen Method

These days, most commercial airplanes have seatback screens throughout the cabin. When it is turn for a passenger at a seat to exit, that seatback screen may be flashed a green background with "your turn to exit now" message and arrow. In some embodiments, iconography that uses the universal red light/greenlight traffic sign may be used to avoid any language related issues for international passengers.

In some embodiments, a similar technique may also be used in airplanes with only overhead screens. For example, messages may be displayed indicating a zone of deplaning, e.g. "this section now" indicator instead of more granular "your seat now" that could be displayed on a seatback monitor.

2B. Passenger PED Method:

In some embodiments, passenger personal electronic devices (PEDs) or an onboard website that supports pairing PEDs to seats as disclosed in U.S. Pat. No. 9,694,725 (based on U.S. application Ser. No. 14/693,541, filed on Apr. 22, 2015), incorporated by reference in its entirety herein may be used to track whether a passenger is still in the airplane or has deplaned. Based on a paired PED, a "time to deplane" message may pop up on the PED with an optional sound alert. The sound alert may be useful in case the passenger is wearing a personal headphone.

In some embodiments, a PED radio frequency (RF) location monitoring methods (Bluetooth beacons, Wi-Fi levels, etc.) to know when a row is empty or when a passenger passes a bulkhead. For example, the wireless access points described with reference to FIGS. 1 and 2 may be used for this purpose. The features of the exit script and next row triggers may be aware of the passenger manifest, where and how full the aircraft is, so that empty rows are not "asked to leave" and less time allocated for a single person in a row compared to a fully occupied row.

2C. Passenger Services System (PSS) Overhead Lights Examples

On aircraft where the in-flight entertainment (IFE) has the capability (e.g., wide-bodies and some narrow-bodies) the IFE system could trigger both the overhead attendant row call light and reading lights to activate over the row and seats when they should stand up and leave. This prompting may also be done under control of the onboard server that is executing the script.

3. Examples of Customization of the Script

Using the script-based approach, various deplaning orders may be easily implemented. For example, different airlines may have different policies regarding preferred deplaning orders. The script-based approach allows airlines to easily customize whichever order is most efficient—including for example customizing deplaning orders based on airplane equipment type, geographical region being server, and so on. Various airlines policies may be built into the script as described herein, whether it is most efficient (aisles first), typical (front rows to back), frequent flyers first, or those with short connection times. Airlines could select which preference to use normally, and cabin crew could elect to make overrides. Some examples are also disclosed in Section 6. In some cases, if a passenger seated in a window seat has a high priority for deplaning, for social distancing compliance, other passengers in the row may also be included with same deplaning priority. In some embodiments, passengers may be asked information about their vaccination status during boarding or when obtaining a boarding pass. This information may be used to customize the script according to a rule. For example, one rule may give higher priority for deboarding (or boarding) passengers who are vaccinated. In some embodiments, a rule may separate out vaccinated passengers from unvaccinated passengers during the boarding or deplaning process. In some embodiments, a rule may implement relaxed social distancing requirement around a vaccinated passenger compared to an unvaccinated passenger. Other rules may also be implemented according to local practice, airlines policies or other laws.

4. Examples of Passenger Manifest Information

Passenger manifest information may include information about passengers on an aircraft which may be useful to determine the boarding order or deplaning order or provide additional information about contact tracing. For example, this may include identifying passengers based on identities of mobile apps on PEDs, passenger information of previous airlines travel, other location data for contact tracing, passenger priority (business class, traveling with family, age information, etc.). In some embodiments, priority information may be used in deciding deplaning order such that higher priority passengers may be favored for earlier deplaning. In some embodiments, a passenger's vaccination status for a multitude of contagious diseases may be included in the passenger manifest information. The vaccination information may be volunteered by the passengers during boarding or check-in process. Additional embodiments are disclosed in Section 13.

5. Examples of Travel Configuration of the Airplane

In some embodiments, the travel configuration may comprise airplane occupancy map and identities of passengers in each seat, e.g., using the passenger manifest information described in Section 4. Prior to a travel segment, a travel configuration may be determined according to issued tickets with assigned seats. However, during travel, passengers may move around. Also, sometimes, no seating may be assigned. In such a case, after take-off, during flight, travel configuration may be determined based on sensor inputs such as seat occupancy based on weight, proximity of PEDs to known locations on the airplane such as wireless access points other proximity sensors.

In some embodiments, travel configuration information may be used in determining the script for deplaning. For example, travel configuration information may indicate that no passengers are seating in a certain row. In that case, the allowed time for deplaning from a previous row to a next row after the unoccupied row may be adjusted to be less than the deplaning time for other rows that are consecutively occupied.

In some embodiments, the travel configuration may be responsive to passenger vaccination information. For example, as described in the present document, passengers may be asked during check-in or boarding about whether they have been vaccinated against certain communicable diseases. This information may be used to decide the seating zones of passengers. For example, in some embodiments, seating areas of passengers may be assigned according to vaccination status. Depending on a policy, vaccinated and non-vaccinated passengers may be grouped separately, or may be seated such that non-vaccinated passengers are separated by vaccinated passengers. As further described in the present document, a similar strategy may be followed when boarding or deplaning passengers.

In some cases, travel configuration information may be used for contact tracing. For example, a threshold may be programmed such that passengers that are within the threshold separation from another passenger with potential exposure to a communicable disease may be notified. Alternatively, or in addition, airlines crew may be notified of such a possible travel configuration so that the crew may re-seat a passenger.

6. Examples of Crew Inputs

The script may be responsive to inputs from crew, both during flight and after landing during deplaning. For example, the onboard computer may provide a user interface to the crew on which a planned order of deplaning may be depicted. In addition, visual cues may be used to indicate any potential issues or an explanation of the planned deplaning order. Crew members may be allowed to override the planned deplaning order by entering appropriate authorization. The crew members may be able to, for example, re-order the deplaning zones of the airplane or adjust up or down the time gaps between different deplaning zones. A deplaning zone may be, for example, a section of the airplane (e.g., business class or economy class), an entire row, or a section or a row (e.g., middle seats of a row) or a single passenger seat.

During deplaning, crew members may be able to manually pause, speed up or slow down execution of the script. For example, if any problems arise during deplaning, e.g., a passenger is not able to pull out a bag), the crew member may be able to temporarily pause script execution. Similarly, a crew member may be able to modify the type of prompting and the onboard electronic equipment used for the prompting. Additional examples of crew input to control the deplaning order are disclosed in Section 14.

In some embodiments, a control app may be provided to cabin crew. A crew member may be able to use the control app from his or her own PED to control editing, monitoring, activation and execution of the script according to various techniques described in the present document.

7. Examples of Script

The script may be an ordered list using which passenger deplaning may be orchestrated. In some embodiments, the script may be in a human-readable file format such as an XML file. In some embodiments, the script may be depicted on a user interface in textual format and/or accompanying graphics. The graphics may show, for example, a map of the airplane along with a planned deplaning order.

In some embodiments, the script may be organized as a list of position entries. Each entry may include a first field indicating a deplaning zone. Each entry may include a second field indicating a priority associated with the deplaning zone. Each entry may include a third field indicating additional information such as a unique identifier for contact tracing, associated with the zone.

In some embodiments, the position entries may be implicitly understood to be separated by a time interval allocated for deplaning from the zone corresponding to the entry. The time interval may be fixed (e.g., 30 seconds between consecutive position entries) or may be dependent on the priority and/or a place of the position entry in the list. For example, earlier entries may be separated by smaller time intervals than later entries.

In some embodiments, the position entries may be explicitly separated by time entries in the script. Each time entry may indicate a time duration allocated for passenger from a zone to begin deplaning before passengers from the next zone in the list are alerted about their turn to begin deplaning.

Some example embodiments of the script are also disclosed in Section 14. In these embodiments, the script may include information about a method used for prompting a passenger or a deplaning zone may be included in the script. In some cases, this information may be presented as icons on a user interface such that a crew member can easily select the icon to associate a corresponding electronic device method on which prompting is performed (e.g., an overhead bulb, or a seatback display, or a PED, etc.).

8. Examples of Advancing Execution of Script

In some embodiments, the execution of script may advance based on the time interval information that is implicitly or explicitly included in the script. In some embodiments, an external trigger may cause the script to advance from one entry about one deplaning zone to the next entry in the script. In some embodiments, the trigger may be an input from a crew member. For example, the script may be advanced based on crew input, e.g., as described in Section 6. In some embodiments, the trigger may be based on a sensor feedback, as described in Section 9.

9. Examples of Advancing Script Based on Sensor Feedback

In some embodiments, execution of the script for deplaning may be advanced based on a sensor feedback. For example, in some embodiments, after a zone is prompted for deplaning, weight sensors embedded in seats in the zone may be used to ascertain whether passengers have actually left the seats. In some embodiments, passenger identity from a passenger manifest may be used along with a proximity sensor located near exit door of the airplane to check whether passengers from a zone have deplaned. The proximity sensor may be a wireless sensor such as a Bluetooth sensor. In some embodiments, a door sensor such as an infrared or a visual camera and processing that records numbers of passengers who have actually left the airplane.

10. Examples of Prescreening Embodiments

Currently to fly a commercial transport aircraft, Federal Aviation Agency (FAA) requires that all passengers view a safety presentation before flying. In airplanes with seatback IFE, flight attendants are freed from having to present the same presentation every flight because all passengers are able see the video safety presentation on the display in front of them. Recently, new FAA regulations were introduced that require screens to be visible at all phases of flight.

In recent days, due to social distancing guidelines, boarding and preboarding procedures have become more time consuming due to requirements such as passenger screening for health checks (e.g., temperature check or testing for Covid-19 or other contagious diseases). Due to this, it is desirable to reduce any steps in this process to shorten the process and correspondingly improve passenger experience.

11. Brief Summary of Prescreening

In some embodiments, passengers may be allowed to view the safety video before boarding. The passenger viewing may be electronically monitored to generate a record that the video was entirely seen through and the record may be transmitted it back to the passenger boarding system for selective passenger boarding. For example, passengers that have not yet watched the safety video are taken aside to watch it first before boarding while passengers that have watched the safety video may be preferentially allowed to board first. The safety video demonstration and a validation of its viewing may occur at many possible steps during a passenger's travel.

For example, in some embodiments, a passenger may be able to view safety video during online check-in. Similar to other online training tools, a passenger may be given the option to, or required to, watch the entire safety video before completing the check-in process to acquire their boarding card. This could be accomplished via the airline website or by using an airline app on the passenger's PED.

In some embodiments, the passenger may be able to watch the safety video on the airlines website after check-in has been performed. There may be a time window prior to the flight departure time within which the passenger may be allowed to watch the safety video. For example, the time window may open 24 hours before departure time all the way up to 1 hour before actual departure. Passengers that have airline apps installed on their mobile devices may be able to watch the safety video at their convenience even after their boarding cards are already loaded on the mobile app.

In some embodiments, a passenger may be able to watch a prescreening of the safety video while waiting in the boarding area. The safety video could be playing in a loop on one or more screens. Passengers who have not already watched the safety video before would watch it and then scan their boarding card (or QR code on their PED) on a device to acknowledge that they have watched the safety video. Alternatively, and desirably to avoid passengers closing in on the QR reader(s), a button could be presented on the airline app on the PED. For passengers who have not loaded the app, an airport Wi-Fi access point could be set up with local web server that accomplished the same functions.

In some embodiments, at the final gate, before the jetway, the boarding system may be queried to ensure that the passenger has watched the video. If not, the passenger could be redirected back to the screens in the boarding area to watch it.

In some cases, passenger manifest information (see, e.g., section 4) may be updated to include whether or not the passenger has watched safety video prior to boarding. In some embodiments, passengers could still board without having seen the safety video, but because the boarding system database would get loaded into the IFE system, only those passengers who haven't already watched the safety video will be required to view the video at their seat or on their paired PED while on board. For example, the onboard controller may process the passenger manifest information and selectively provide safety video only to those passengers that have not already viewed the safety video demonstration. How to present this video may be decided based on passenger manifest information about passenger preference— e.g., on a seatback monitor or on passenger's PED.

12. Examples of PED Embodiments for Prescreening

In various embodiments, airline apps may be enhanced with the following additional functionalities to help with faster clearance of pre-boarding formalities for meeting health and safety regulations.

In some embodiments, temperature or heart rate screening may be performed using a device's camera. For example, passengers may be asked to take a selfie and a picture or a video or other sensory information gathered from a passenger device (e.g., a smartwatch or a phone) is processed to extract temperature, heart rate, even respiratory rates from the video.

If the passenger has a more accurate temp reader (such as a Kinsa device) the reading would be considered more reliable. The passenger manifest information may be updated to include an indication that a passenger has successfully passed health prescreening.

In some embodiments, a passenger may be given the option of submitting social contact history to the airline, which could be integrated with Apple or Google built-in features. Such embodiments may further implement passenger privacy protocols appropriate under local regulations.

During flight, the passenger manifest information, specifically the data from the prescreening scans would be uploaded to the IFE system, and presented to the cabin crew on the seat map. Passengers with "warning" level biometric data could be flagged for the crew to more closely monitor throughout the flight. In some embodiments, such information may be purged after each flight segment, unless required to be held for medical or legal reasons.

In some embodiments, passengers may be allowed to opt into an arrangement in which passenger vitals are monitored through IFE seatback cameras or by the onboard server communicating with passenger's PED to monitor passenger health status.

13. Examples of Gathering and Using Passenger Vaccination Information

In some embodiments, passenger vaccination information may be gathered. For example, when a passenger checks in to obtain a boarding pass, the passenger may be asked for vaccination information. For example, on a user interface, a list of various disease names may be displayed and the passenger may be prompted to select the ones for which he/she has received a vaccine. In some embodiments, if a passenger refuses to provide such information, then the passenger may be considered to be an unvaccinated passenger. The passenger vaccination information may be added to the passenger manifest information (See section 4).

In some embodiments, the passenger vaccination information may be used to control an aircraft boarding order. For example, passengers may be incentivized with early boarding in case that they have been vaccinated for certain diseases that are considered to be critical diseases (e.g., if there is a current health advisory for these diseases, or if these diseases are considered highly contagious in an airplane setting). In some embodiments, passengers that are not vaccinated may be assigned seats that provide least exposure to other passengers during the boarding process. For example, these passengers may be allowed to board first towards rear of the aircraft to avoid them walking past other passengers seated in front of the airplane. The order of deplaning may also similarly be controlled using vaccination data. For example, in some embodiments, vaccinated people may be incentivized to deplane first, using a prompting technique as disclosed in the present document.

In some embodiments, passenger vaccination information may be analyzed for contact tracing or for identifying and isolating potentially risky passengers. For example, each passenger may be classified into one of multiple risk classes. The classification may be based on a variety of factors such as—a past time window of the passenger's social contacts or visited geographical information (e.g., departure or transit city), a vaccination status, a list of diseases for which the classification is to be performed, whether the passenger is traveling in a group, and so on. Further, the boarding order or deplaning order may be determined according to the risk category of the passenger.

In one advantageous aspect, the gathered information may be used for contact tracing. For example, given a time window (e.g., 2 weeks), and a known set of geographical locations and/or persons and/or diseases, a search may be made through passenger manifest information for all flights of an airlines in this time period to identify passengers that may have had exposure to risky situations. For example, if it is determined that there was an outbreak of disease A in city B, in a time period C days ago, then airlines passenger manifest information may be analyzed for all passengers that traveled from or to or through city B, during time period C and whether or not they were vaccinated for disease A. This information may be provided for use by health authorities, and also may be used in determining boarding or deplaning order.

In some embodiments, the vaccination information or risk classification may be used to set up a correct passenger travel configuration (see, e.g., Section 5). For example, in some embodiments, unvaccinated passengers may be separated from each other by intervening vaccinated passengers. In some embodiments, separate zones may be allocated to different risk categories of the passengers.

14. Examples of Airplane Systems

FIG. 1 shows an example system in which the boarding and deplaning methods described in the present document may be implemented. An airplane 102 is depicted to include multiple passenger seats, Seat 11 to Seat 66. The airplane 102 may include an antenna 126 that is configured to communicate with external communication sources such as a satellite network that includes one or more satellites 108, 110, 112. Satellite communication may be used for both downloading information and uploading information. Wi-Fi 128 at airport gate(s) and Cell-phone modem 130 through a Cell Phone Tower 132 may be used to both downloading information and uploading information from/to ground server 114 through the Internet 134 and from/to database 116 as illustrated most notably in FIGS. 1 and 2.

The airplane 102 may include a server 122, one or more wireless access points 120 and an antenna 124 that is configured for communication with a ground server 114 that includes a database 116.

Also shown in FIG. 1 is an example of a script 104a that is used for deplaning the airplane 102. The script 104 may include a list of entries that show zones to be deplaned in an ordered. For example, the first entry shows that seats 11, 31, 14, 34 are to be deplaned first, followed by seats 34, 16, 36, 13 and 33, and so on. Corresponding to each entry, there may be an onboard electronic device on passengers may be alerted for deplaning. For example, for the above-listed seats, a message may be displayed on a seatback screen. For the next entry (corresponding to seats 41, 33, 61 and 64) a message may be sent to passengers' personal electronic devices (PEDs) for deplaning instructions. In one example, as illustrated in FIG. 1, seats 11, 31, 14, 34 (first) and seats 16, 36, 13, and 33 (second) are scripted as passengers for physical separation and/or time gap at deplaning and passengers are prompted each for exiting via an Seatback Screen (illustrated by a screen icon); seats 41, 44, 61, 64 (first) and seats 46, 66, 43, 63 (second) are scripted as passengers for physical separation and/or time gap at deplaning and are prompted each for exit via a Passenger PED (illustrated by a mobile device icon); and seats 21, 24, 26, 46 (first) and seats 31, 51, 36, 56 (second) are scripted as passengers for physical separation and/or time gap at deplaning and are prompted each for exit via an overhead lighting (illustrated by a light bulb icon).

FIG. 2 shows an airplane system similar to the system depicted in FIG. 1. This system uses a different script 104b in which overhead lighting is used for deplaning first zone, followed by seatback screen display, followed by passenger PEDs for prompting passengers that their turn to deplane has come. In one example, as illustrated in FIG. 2, seats 11, 12, 25, 26 (first) and seats 31, 32, 33, 16 (second) are scripted as individual passenger(s) and/or group(s) of passengers for physical separation and/or time gap at deplaning and individual passenger(s) and/or group(s) of passengers are prompted each for exiting via overhead lighting (illustrated by light bulb icon); seats 41, 42, 43, 66 (first) and seats 45, 46, 62, 63 (second) are scripted as individual passenger(s) and/or group(s) of passengers for physical separation and/or time gap at deplaning and are prompted each for exit via a Seatback Screen (illustrated by a screen icon); and seats 21, 22, 23, 36 (first) and seats 31, 32, 26, 23 (second) are scripted as individual passenger(s) and/or group(s) of passengers for physical separation and/or time gap at deplaning and are prompted each for exit via an Passenger PED (illustrated by a mobile device icon). In some embodiments, passengers, individual passenger(s), and/or group(s) of passengers, and/or airline personnel can each select one or more mode(s) of alert for deplaning, e.g., Seatback Screen, overhead lighting, Passenger PED, for example, by entry into to a Seatback Screen, a passenger manifest, or an airline companion app downloaded on a mobile device (a Passenger PED) of a passenger. In some embodiments, passengers and/or individual passenger(s) and/or group(s) of passengers are selected for ordering of deplaning in accordance with one or more screening criteria including: available medical history, results of last known medical examination, vaccine record, family medical history, location of origin for flight, location of destination of flight, location of layover flight, news or history of medical events at origin, destination, or layover flight, monitor passenger health status during flight, traveling together family members, traveling together friends, business partners, and/or any other methods or systems described above or below, for example, in sections 3, 7, and 8, for adjustment of deplaning ordering, for example, physical separation or time gap(s) between deplaning of passenger seats (as illustrated in FIGS. 1 and 1), any empty seats or rows, or the like. In FIGS. 1 and 2, the server 122 may be implemented using the device 300 described below with reference to FIG. 3. The server 122 may implement the script described in the present document. The wireless access points 120 may be used for prompting PEDs via messages to deplane. In some embodiments, the wireless access points may be used for detecting PEDs based on signal quality (e.g., signal strength) and this information may be used to determine travel configuration of the airplane during flight. The antenna 124 may be used for communication between the ground server 114 and the server 122. The ground server 114 may provide the server 122 with passenger information, or passenger manifest, prior to the departure of the flight. The ground server 114 may also provide additional information about passenger such as passenger's previous flight history or other social activities such that contract tracing can be performed.

Figure 3:
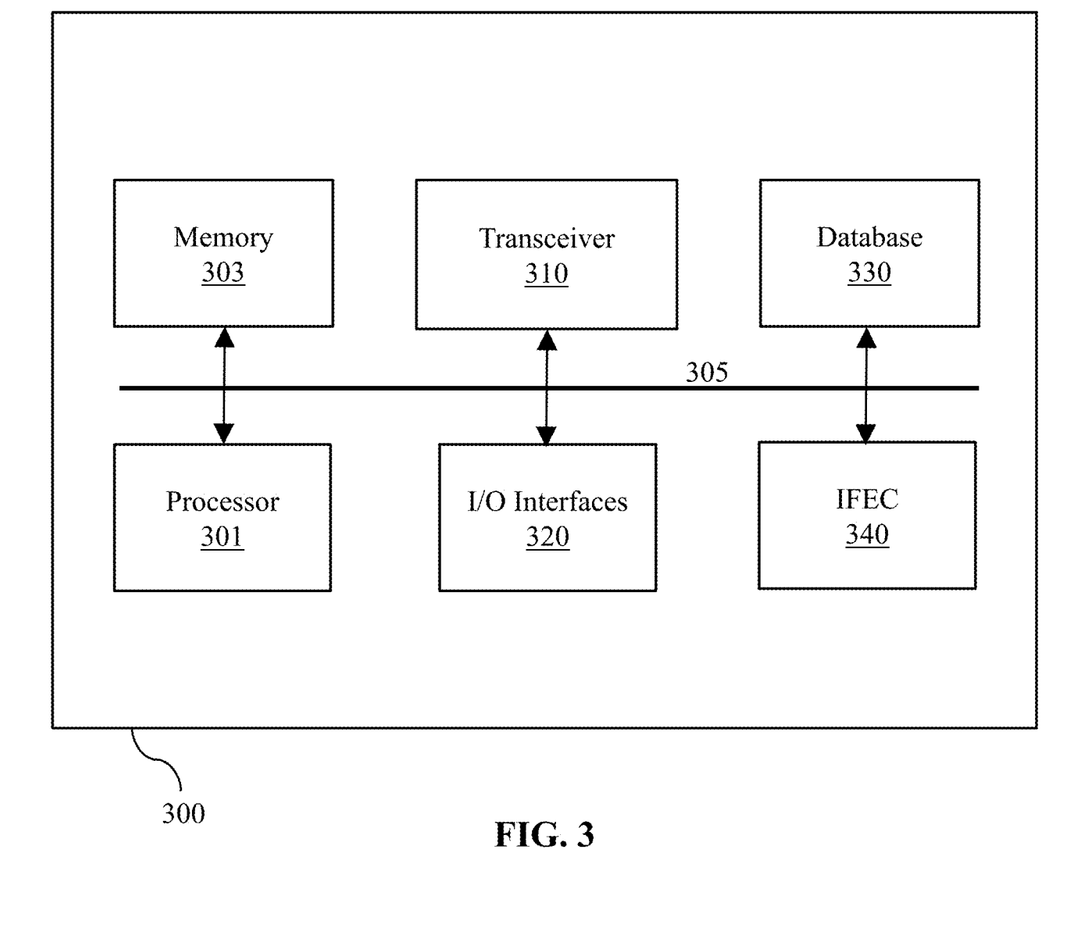
FIG. 3 shows an example of a hardware platform.

FIG. 3 shows an example architecture of a device 300 that can improve dataloading in an airplane. As shown therein, the device may include a processor 301 and a memory 303, which are connected to a bus 305. In an example, the bus 305 may be a Controller Area Network (CAN) bus. In another example, the bus 305 may be an avionics data bus (e.g., ARINC 429, 615, 629 or 664). The processor 301 and memory 303 are further connected, via the bus 305, to at least a transceiver 310, input/output (I/O) interfaces 320, a database 330 and an in-flight entertainment connectivity (IFEC) system 340.

In some embodiments, one or more of the components of the device 300, shown in FIG. 3, may be combined, or implemented independently in another device. For example, the IFEC system 340 may not be directly connected to the bus 305, but may be connected to a different bus (not shown in FIG. 3) that can communicate (either through a wired or wireless connection) with bus 305. For another example, the database 330 or the transceiver 310 may be part of the IFEC system 340, instead of a separate component. For another example, the database 330 could include multiple databases.

Figure 4:
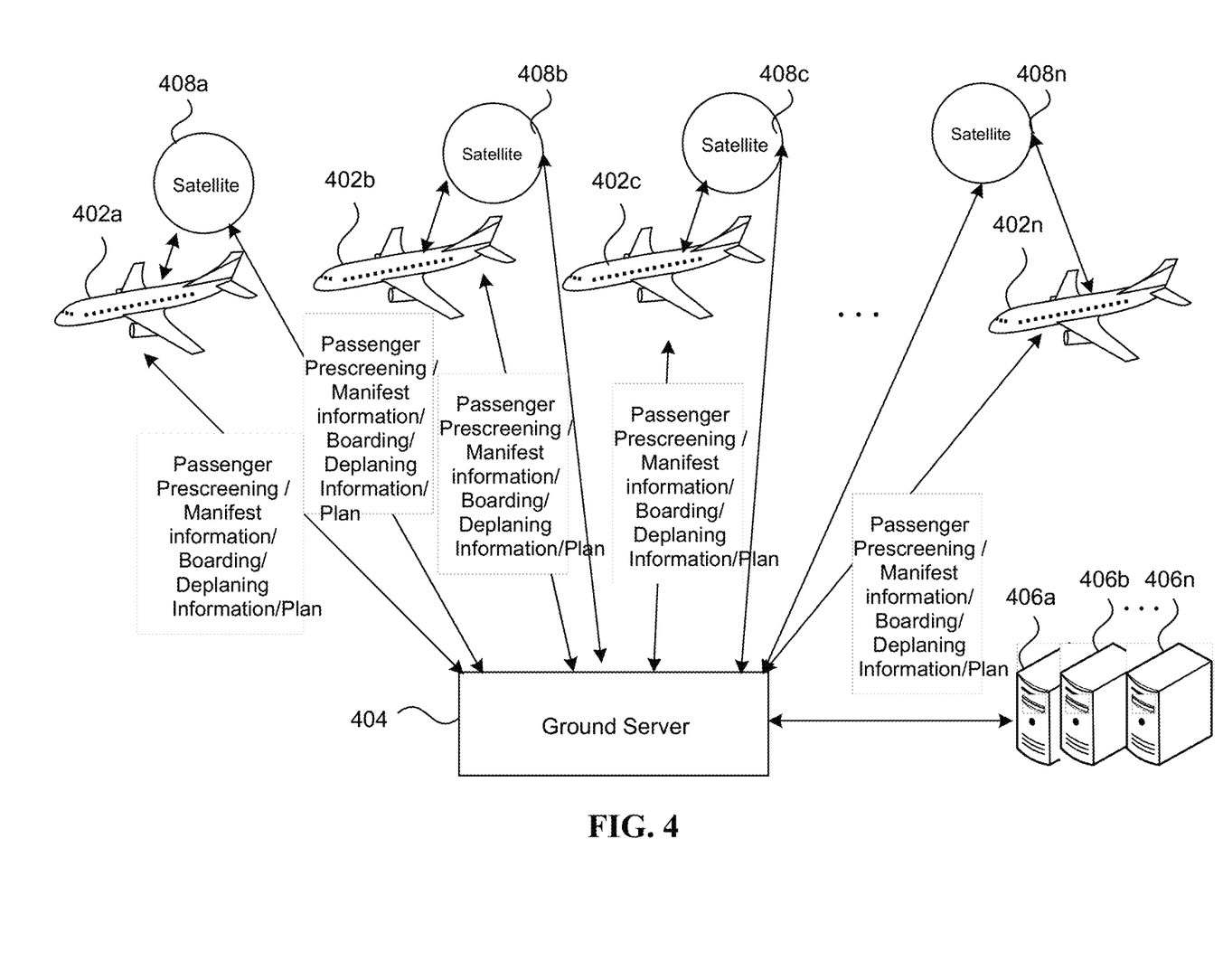
FIG. 4 shows an example of a system in which passenger manifest information is collected and distributed.

FIG. 4 shows a communication network in which passenger prescreen information and/or passenger manifest information and/or boarding plan and/or deboarding (deplaning) information/plan may be collected and communicated to airplanes. A ground server 404 (which may operate similarly to the ground server 114) may be configured to communicate with airplanes 402a, 402b, . . . 402n either via a direct communication link or through a satellite connection using satellites 408a, 408b, 408c, . . . 408n. Databases 406a, 406b, . . . 406n may be used to store passenger information including passenger preferences, previous flight information, passengers prescreening formalities completion etc. The ground server 404 may communicate passenger information including the prescreening information and/or the manifest information and/or boarding and/or deboarding (deplaning) information/plan to an airplane prior to take off. This information may be used by a server on the airplane to complete pre-flight formalities and also to determine deplaning order as described in the present document.

Figure 5:
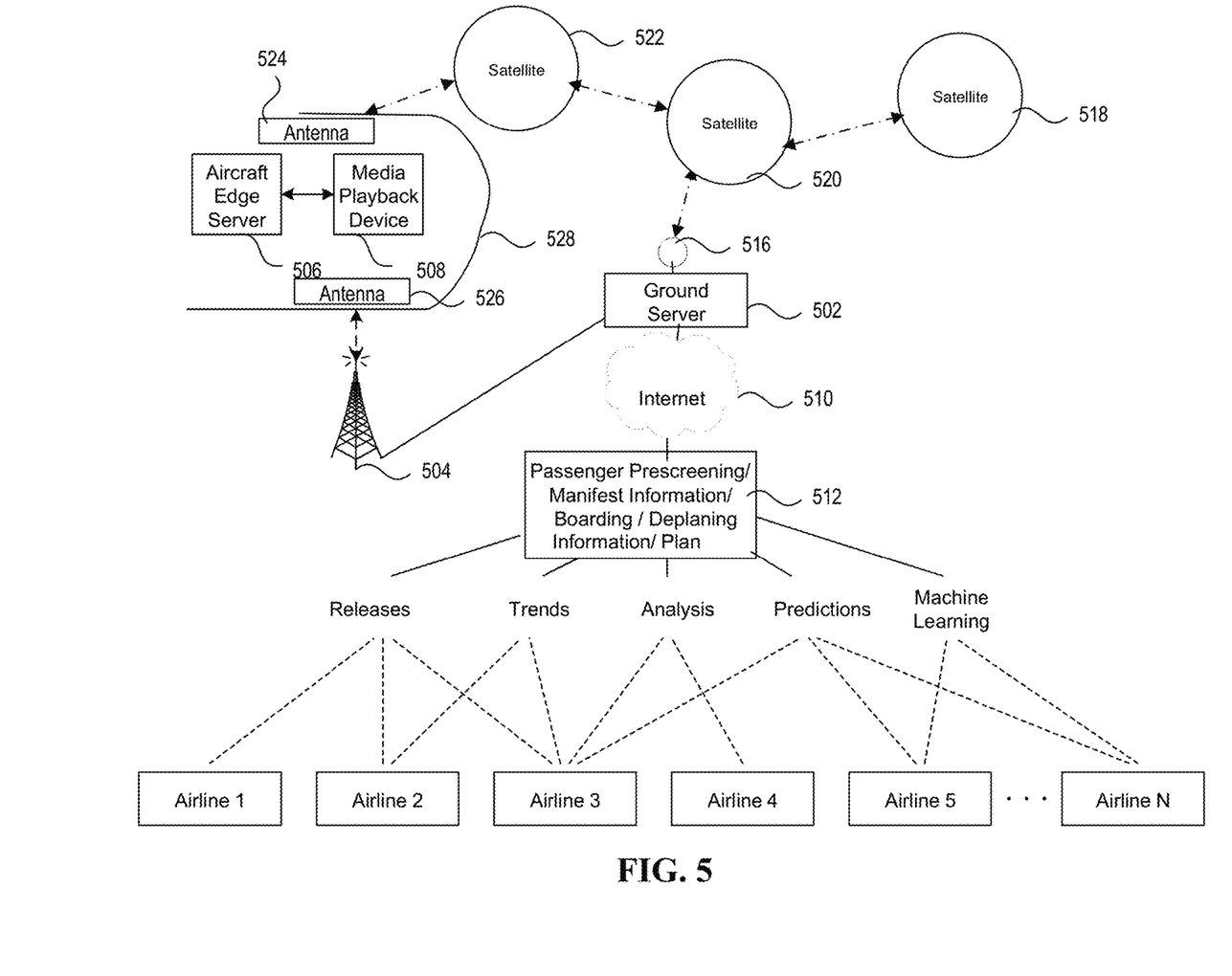
FIG. 5 shows an example of a system in which passenger manifest information is used for flight boarding or deplaning.

FIG. 5 shows another configuration of a system in which a ground server 502 may use information from multiple flights of multiple airlines (Airline 1, Airline 2 . . . Airline N). This information may be processed to, for example, establish contact tracing information based on prior passenger travel information, disease spread trends at various previous locations where passengers were, predictions for upcoming flight of passengers in terms of possibility of dangerous proximity of passengers, and so on. In some embodiments, machine learning may be used to train a logic to perform contact tracing. Results of such analyses may be combined into the passenger prescreening/manifest information/boarding/deboarding (deplaning) information/plan 512 and stored at the ground server 502, possibly via communication through the internet 510. The ground server 502 may communicate the information via a satellite dish 516 with a network of satellites (518, 520, 522), which in turn is received in an airplane via antenna 524 by an onboard server (called edge server 506). The edge server 506 may implement the deplaning script described herein, along with providing media data to media playback devices onboard the airplane 528. Alternatively, or in addition, the ground server 502 may communication the information to the edge server 506 through a terrestrial connection such as through cellular communication via a cellular network 504 to a cellular reception antenna 526 onboard the airplane. The ground server 502 may be used, for example, to collect and distribute passenger prescreening information regarding watching of safety video and other contact tracing information.

14. Additional Embodiment Examples

Figure 6:
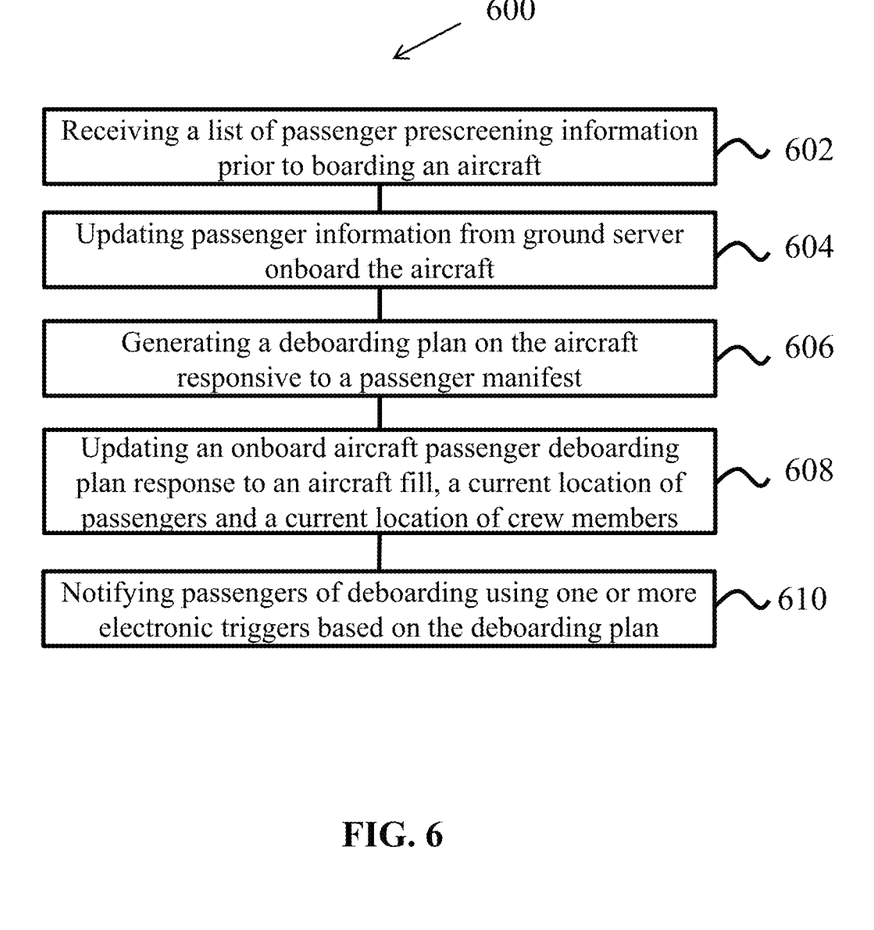
FIG. 6 is a flowchart for an example method of passenger deboarding.

In some embodiments, a method (e.g., method 600 depicted in FIG. 6) of managing passenger traffic in an airplane may include receiving (602) a list of passenger prescreening information prior to boarding an aircraft; updating (604) passenger information from ground server onboard the aircraft; generating (606) a deboarding plan on the aircraft responsive to a passenger manifest; updating (608) an onboard aircraft passenger deboarding plan response to an aircraft fill, a current location of passengers and a current location of crew members; notifying (610) passengers of deboarding using one or more electronic triggers based on the deboarding plan.

As disclosed herein, some of the techniques may be implemented in a computer system that may be configured to operate onboard an airplane. The computer system may include an onboard computer located on an airplane, the onboard computer comprising one or more processors configured to execute a script, wherein the script controls an order by which passengers on an airplane are prompted for deplaning. The computer system may include onboard electronic equipment of the airplane that is coupled to the onboard computer and configured to prompt passengers to deplane the airplane in the order according to execution of the script by the onboard computer at an end of the travel segment. The one or more processors may be configured to update the script for a travel segment of the airplane using a first input comprising a passenger information for the travel segment or a second input comprising a travel configuration of the airplane during the travel segment or a third input from onboard crew of the airplane.

As further described in the present document, e.g., section 2, the onboard electronic equipment includes a public announcement system or passenger seatback displays or overhead lights or passenger personal electronic equipment and correspondingly the prompting passenger to deplane includes playing overhead announcements or displaying a visual prompt to deplane or activating the overhead lights or sending a message to the passenger personal electronic equipment.

As further described in the present document, e.g., sections 3, 7 and 8, the script may be an ordered list of airplane zones for deplaning and time gaps between the deplaning from the airplane zones.

As further described in the present document, e.g., sections 3, 7 and 8, the time gaps between the deplaning are responsive to the passenger information are updated during the updating.

Other features of the above-mentioned computer system are described throughout the present document.

In some embodiments, the techniques described in the present document may be embodied in the form of a computer readable medium storing processor-executable code. The code, upon execution by one or more processors, may cause the processors to implement a method that includes storing a default script that controls a default order by which passengers on an airplane are prompted for deplaning, updating the script for a travel segment of the airplane using a first input comprising a passenger information for the travel segment or a second input comprising a travel configuration of the airplane during the travel segment or a third input from onboard crew of the airplane, and controlling onboard electronic equipment of the airplane by executing the script at an end of the travel segment by prompting passengers to deplane the airplane in the order. Various additional features and aspects of this method are described throughout the present document.

In some embodiments, a method of assisting passenger boarding on an airplane may include generating a passenger manifest information for an upcoming airplane travel, wherein the passenger manifest information includes, for each passenger, an indication regarding whether the passenger has completed pre-boarding safety formalities, and providing a feedback for selective boarding of passengers for the upcoming airplane travel, based on the indication. The generating the passenger manifest information includes providing passengers an opportunity to complete the pre-boarding safety formalities and receiving a feedback from the passengers regarding the completion. In some embodiments, the opportunity is provided at the time of online check-in to obtain a boarding pass. In some embodiments, the opportunity is provided based on a mobile app. In some embodiments, the opportunity is provided near a boarding gate area using a display at the boarding gate area. The feedback from the passenger may be implicit (e.g., by eye tracking or by completion of video) or explicit (e.g., by menu screens on which a passenger affirmatively confirms completion of health formalities). The health formalities may include watching a safety video or answering a social contacting questionnaire or answering questions about passenger health such as whether the passenger has fever or was exposed to a potentially dangerous or communicable disease. Additional health information collected from the passengers may include vaccination records, whether the passenger had certain diseases, any preexisting conditions that may make the passenger more susceptible to onboard infections, number of passengers traveling together in a party, ages, locations of number in party traveling together and so on. This information may be used to alert the onboard computer system and/or crew members of a potential health situation that may be further monitored during travel.

The above-described method may be implemented by a ground server. The ground server may further communicate with an onboard server to communicate the information about passenger manifest. The onboard server may use this information to selectively present safety videos or perform monitoring of passengers that potentially pose health dangers during the flight. Additional features of this method are described in Sections 10 to 14.

It will be appreciated that various techniques are disclosed to allow embodiments to implement safe and speedy passenger boarding or deplaning are disclosed. It will further be appreciated that while various embodiments are described in the context of airplane boarding and deplaning, these techniques may be implemented in other commercial passenger vehicles such as trains, buses, cruise ships, and so on.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

The invention claimed is:

1. A method of managing airplane deplaning, comprising:
configuring an onboard computer to execute a script, wherein the script controls a default order by which passengers on an airplane are prompted for deplaning;
updating the script for a travel segment of the airplane using (a) a first input comprising a passenger information for the travel segment or a second input comprising a travel configuration of the airplane during the travel segment, and (b) a third input from onboard crew of the airplane that includes a modification to the default order, wherein the modification is communicated, during the deplaning, to the onboard computer using a control application from a personal electronic device (PED) assigned to the onboard crew, and wherein the updating is based on an authorization to override the default order; and
controlling onboard electronic equipment of the airplane by executing the script at an end of the travel segment by prompting the passengers to deplane the airplane in a modified order;
wherein the script is executed by advancing based on sensor feedbacks from one or more sensors comprising weight sensors embedded in passenger seats, wireless proximity sensors configured to determine whether passengers in a zone have deplaned or a door sensor configured to record a number of passengers that have deplaned.

2. The method of claim 1, further including:
collecting sensor information from a sensor indicative of passenger passage during deplaning; and
cross-checking an actual deplaning sequence of the passengers based on the sensor information with the modified order prompted by using the script for a mismatch.

3. The method of claim 1, wherein the configuring the script includes generating the script to comply with a regulatory requirement of a departure destination of the travel segment, an arrival destination of the travel segment, or an airlines policy.

4. The method of claim 1, further comprising:
determining a degree of separation among the passengers based on analyzing the passenger information; and
providing an alert in case that the degree of separation falls below a threshold.

5. The method of claim 1, wherein the second input regarding the travel configuration includes a passenger occupancy map, and wherein the updating the script includes updating the script by using a deplaning priority information associated with at least some of the passengers with the passenger occupancy map.

6. The method of claim 1, wherein the script comprises an ordered list of airplane zones for deplaning and time gaps between the deplaning from the airplane zones.

7. The method of claim 6, wherein the time gaps between the deplaning are responsive to the passenger information are updated during the updating.

8. The method of claim 1, wherein the onboard electronic equipment includes a public announcement system or passenger seatback displays or overhead lights or passenger personal electronic equipment and correspondingly the prompting passenger to deplane includes playing overhead announcements or displaying a visual prompt to deplane or activating the overhead lights or sending a message to the passenger personal electronic equipment.

9. The method of claim 1, wherein the airplane is boarded according to a boarding sequence in which the passengers are allowed to board the airplane based on one or more of: indications of completion of security formalities by the passengers, a passenger occupancy map, or passenger vaccination information.

10. The method of claim 1, wherein the script is organized as a list of position entries, wherein each entry includes a field indicating a deplaning zone, a field indicating a priority associated with the deplaning zone, and/or a field indicating a unique identifier associated with the deplaning zone, and wherein the script includes information allowing a selection of a method for prompting a passenger or the deplaning zone, and wherein the information is presented as user-selectable icons on a user interface of the PED for the selection.

11. A computer system, comprising:
an onboard computer located on an airplane, the onboard computer comprising one or more processors configured to execute a script, wherein the script controls a default order by which passengers on the airplane are prompted for deplaning;
the one or more processors further configured to update the script for a travel segment of the airplane using (a) a first input comprising a passenger information for the travel segment or a second input comprising a travel configuration of the airplane during the travel segment, and (b) a third input from onboard crew of the airplane that includes a modification to the default order, wherein the modification is communicated, during the deplaning, to the onboard computer using a control application from a personal electronic device (PED) assigned to the onboard crew, and wherein updating the script is based on an authorization to override the default order; and
onboard electronic equipment of the airplane that is coupled to the onboard computer and configured to prompt the passengers to deplane the airplane in a modified order according to execution of the script by the onboard computer at an end of the travel segment;
wherein the script is executed by advancing based on sensor feedbacks from one or more sensors comprising weight sensors embedded in passenger seats, wireless proximity sensors configured to determine whether passengers in a zone have deplaned or a door sensor configured to record a number of passengers that have deplaned.

12. The system of claim 11, wherein the onboard electronic equipment includes a public announcement system or passenger seatback displays or overhead lights or passenger personal electronic equipment and correspondingly the prompting passenger to deplane includes playing overhead announcements or displaying a visual prompt to deplane or activating the overhead lights or sending a message to the passenger personal electronic equipment.

13. The system of claim 11, wherein the script comprises an ordered list of airplane zones for deplaning and time gaps between the deplaning from the airplane zones.

14. The system of claim 13, wherein the time gaps between the deplaning are responsive to the passenger information are updated during the updating.

15. A computer readable medium having processor-executable code for implementing a method of managing airplane deplaning stored thereon, the code causing a processor to:
store a default script that controls a default order by which passengers on an airplane are prompted for deplaning;
update the script for a travel segment of the airplane using (a) a first input comprising a passenger information for the travel segment or a second input comprising a travel configuration of the airplane during the travel segment, and a third input from onboard crew of the airplane that includes a modification to the default order, wherein the modification is communicated, during the deplaning, to an onboard computer using a control application from a personal electronic device (PED) assigned to the onboard crew, and wherein updating the script is based on an authorization to override the default order; and
control onboard electronic equipment of the airplane by executing the script at an end of the travel segment by prompting the passengers to deplane the airplane in a modified order;
wherein the script is executed by advancing based on sensor feedbacks from one or more sensors comprising weight sensors embedded in passenger seats, wireless proximity sensors configured to determine whether passengers in a zone have deplaned or a door sensor configured to record a number of passengers that have deplaned.

16. The computer readable medium of claim 15, wherein the code causes the processor to:
collect sensor information from a sensor indicative of passenger passage during deplaning; and
cross-check an actual deplaning sequence of the passengers based on the sensor information with the modified order prompted by using the script for a mismatch.

17. The computer readable medium of claim 15, wherein the code for configuring the script includes code for generating the script to comply with a regulatory requirement of a departure destination of the travel segment, an arrival destination of the travel segment, or an airlines policy.

18. The computer readable medium of claim 15, wherein the second input regarding the travel configuration includes a passenger occupancy map, and wherein code causes the processor to update the script by using a deplaning priority information associated with at least some of the passengers with the passenger occupancy map.

19. The computer readable medium of claim 15, wherein the script comprises an ordered list of airplane zones for deplaning and time gaps between the deplaning from the airplane zones.

20. The computer readable medium of claim 19, wherein the time gaps between the deplaning are responsive to the passenger information are updated during the updating.

\* \* \* \* \*